(12) United States Patent
Kitagawa et al.

(10) Patent No.: US 8,555,004 B2
(45) Date of Patent: Oct. 8, 2013

(54) STORAGE SYSTEM HAVING FUNCTION OF PERFORMING FORMATTING OR SHREDDING

(75) Inventors: Yutaka Kitagawa, Odawara (JP); Akira Ooigawa, Odawara (JP)

(73) Assignee: Hitachi Ltd., Tokyo (JP)

( * ) Notice: Subject to any disclaimer, the term of this patent is extended or adjusted under 35 U.S.C. 154(b) by 58 days.

(21) Appl. No.: 12/298,263

(22) PCT Filed: Oct. 1, 2008

(86) PCT No.: PCT/JP2008/002754
§ 371 (c)(1),
(2), (4) Date: Oct. 23, 2008

(87) PCT Pub. No.: WO2010/038258
PCT Pub. Date: Apr. 8, 2010

(65) Prior Publication Data
US 2011/0173387 A1    Jul. 14, 2011

(51) Int. Cl.
*G06F 12/00* (2006.01)
*G06F 13/00* (2006.01)
*G06F 13/28* (2006.01)

(52) U.S. Cl.
USPC ............ 711/154; 711/114; 711/161; 711/162

(58) Field of Classification Search
None
See application file for complete search history.

(56) References Cited

U.S. PATENT DOCUMENTS

| | | |
|---|---|---|
| 2002/0171867 A1 | 11/2002 | Nobuhara et al. |
| 2004/0156068 A1 | 8/2004 | Yoshida et al. |
| 2006/0155944 A1* | 7/2006 | Kano ............................ 711/161 |
| 2006/0218113 A1 | 9/2006 | Kishi |
| 2007/0130434 A1* | 6/2007 | Chu et al. ...................... 711/163 |
| 2008/0077737 A1 | 3/2008 | Nakase et al. |
| 2008/0083038 A1 | 4/2008 | Fujii et al. |
| 2008/0201544 A1* | 8/2008 | Nakajima et al. ............. 711/166 |
| 2009/0013141 A1* | 1/2009 | Kinoshita ...................... 711/163 |

FOREIGN PATENT DOCUMENTS

| | | |
|---|---|---|
| JP | 2003037719 | 2/2003 |
| JP | 2004246419 | 9/2004 |
| JP | 2007-265492 | 10/2007 |
| JP | 2008-027335 | 2/2008 |
| JP | 2008-90643 | 4/2008 |

* cited by examiner

*Primary Examiner* — Kevin Verbrugge
*Assistant Examiner* — Stella Eun
(74) *Attorney, Agent, or Firm* — Brundidge & Stanger, P.C.

(57) ABSTRACT

It is desired to reduce the danger of leakage of data stored in a logical storage device. A storage system has a detection unit and a security processing unit. The detection unit detects a system change, during which it is not possible to perform I/O for a first logical storage device, among a plurality of logical storage devices in the storage system. And the security processing unit takes this type of system change as the opportunity for performing security processing, i.e. formatting or shredding, upon the first logical storage device.

11 Claims, 17 Drawing Sheets

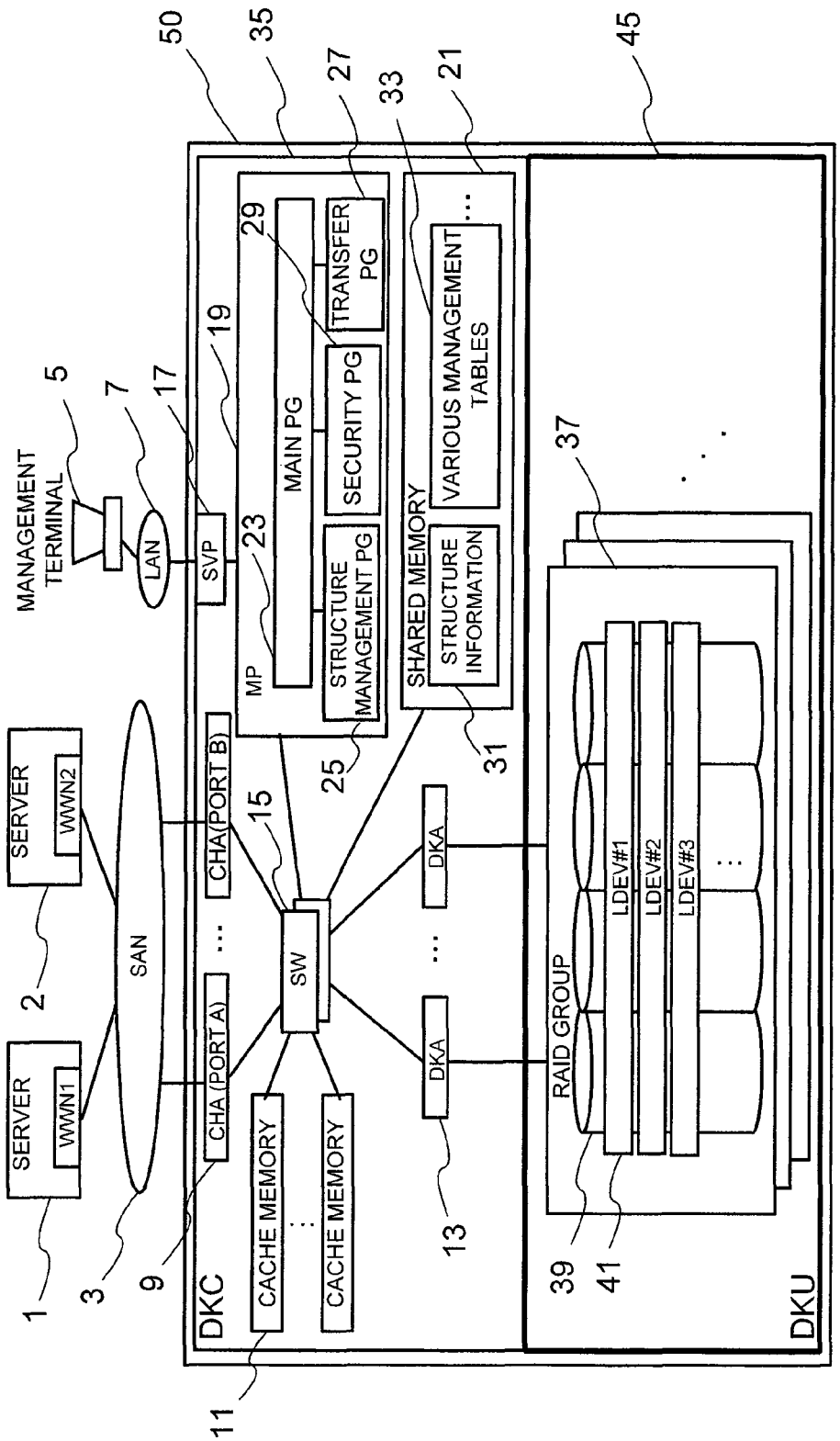

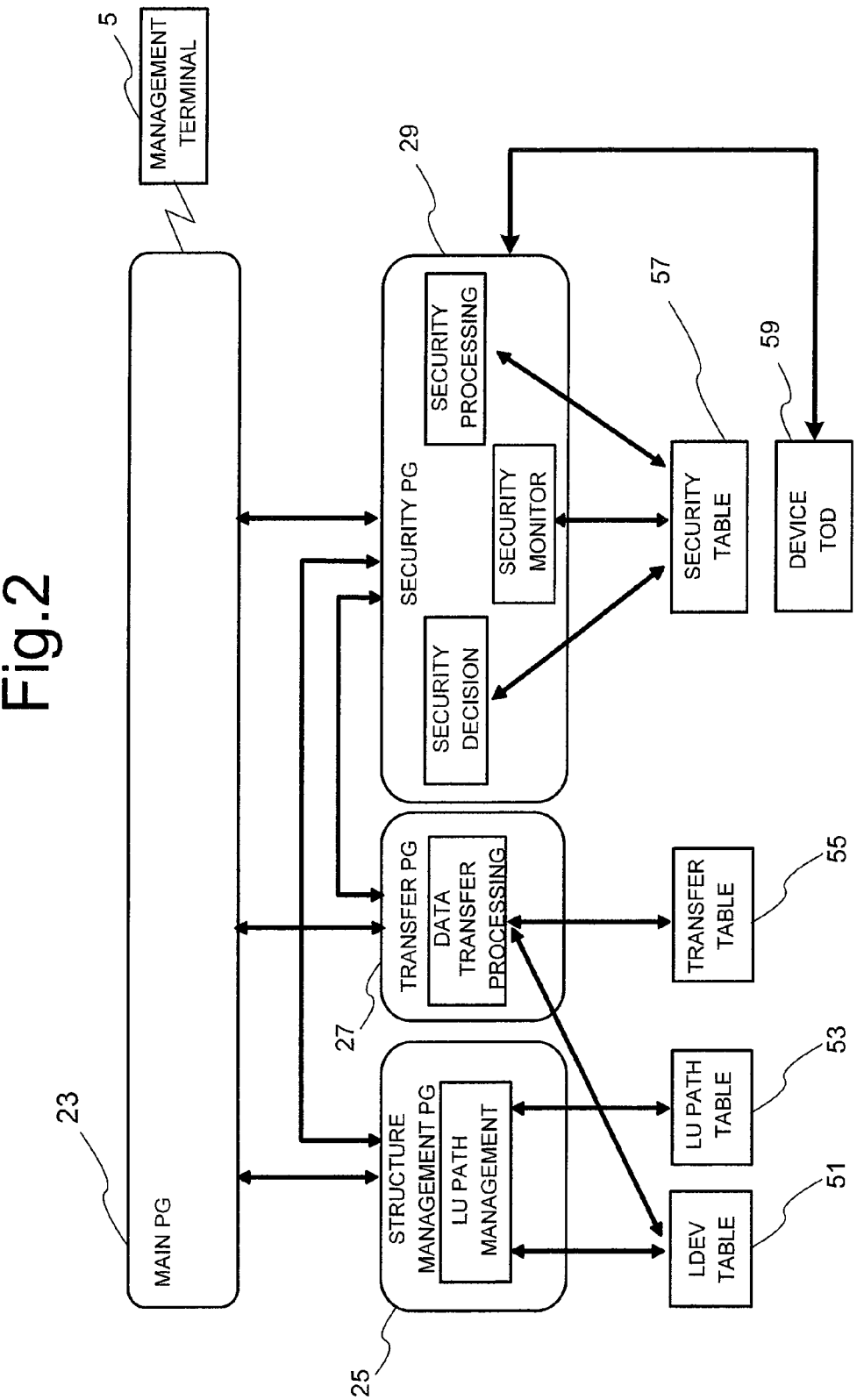

Fig.5A

LDEV TABLE 51

| LDEV | Emulation | CAPACITY | RAID | RAIDGr | NUMBER OF PATHS |
|---|---|---|---|---|---|
| 1 | OPEN-3 | 2.28GB | 5(3D+1P) | 1-1 | 1 |
| 2 | OPEN-3 | 2.28GB | 5(3D+1P) | 1-1 | 1 |
| 3 | OPEN-3 | 2.28GB | 5(3D+1P) | 1-1 | 1 |
| 4 | OPEN-3 | 2.28GB | 5(3D+1P) | 1-1 | 1 |
| 5 | OPEN-3 | 2.28GB | 5(3D+1P) | 1-1 | 1 |
| 6 | OPEN-3 | 2.28GB | 5(3D+1P) | 1-1 | 0 |
| 7 | OPEN-3 | 2.28GB | 5(3D+1P) | 1-1 | 0 |
| 8 | OPEN-3 | 2.28GB | 5(3D+1P) | 1-1 | 0 |
| 9 | OPEN-3 | 2.28GB | 5(3D+1P) | 1-1 | 0 |
| 10 | OPEN-3 | 2.28GB | 5(3D+1P) | 1-1 | 0 |

Fig.5B

LU PATH TABLE 53

| PORT | HOST Gr | LUN | LDEV | Emulation | CAPACITY | RAID | RAIDGr | ALTERNATE PATH |
|---|---|---|---|---|---|---|---|---|
| CL1-A | AAAA1 | 0001 | 1 | OPEN-3 | 2.28GB | 5(3D+1P) | 1-1 | 1 |
| CL1-A | AAAA1 | 0002 | 2 | OPEN-3 | 2.28GB | 5(3D+1P) | 1-1 | 1 |
| CL1-A | AAAA1 | 0003 | 3 | OPEN-3 | 2.28GB | 5(3D+1P) | 1-1 | 1 |
| CL1-A | AAAA1 | 0004 | 4 | OPEN-3 | 2.28GB | 5(3D+1P) | 1-1 | 1 |
| CL1-A | AAAA1 | 0005 | 5 | OPEN-3 | 2.28GB | 5(3D+1P) | 1-1 | 1 |

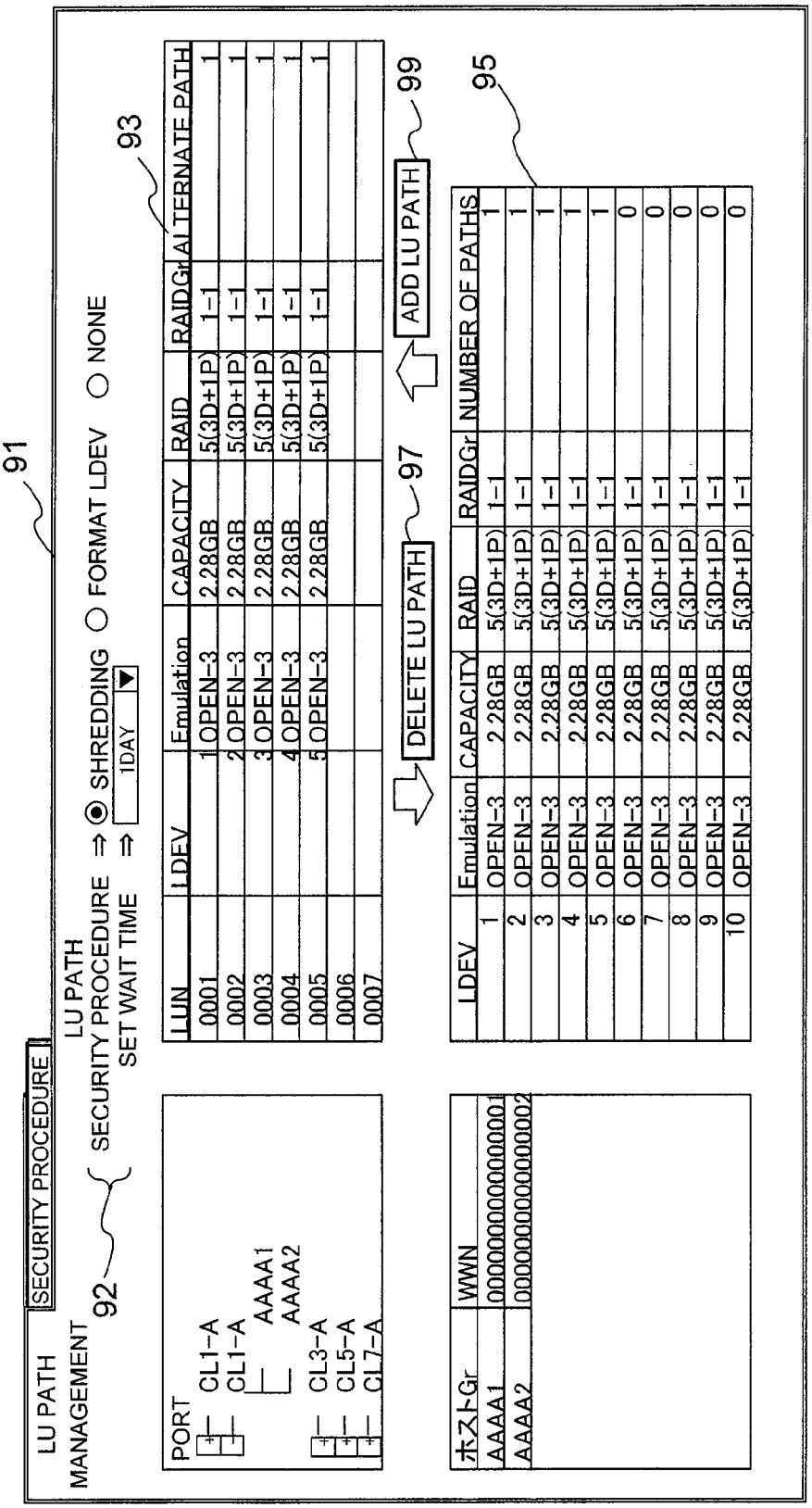

Fig.7

TRANSFER MANAGEMENT TABLE

| | TRANSFER SOURCE LDEV | | | | TRANSFER DESTINATION LDEV | | | STATUS |
|---|---|---|---|---|---|---|---|---|
| LDEV | Emulation | CAPACITY | RAID | RAIDGr | LDEV | RAID | RAIDGr | |
| 1 | OPEN-3 | 2.28GB | 5(3D+1P) | 1-1 | 11 | 5(3D+1P) | 2-1 | TRANSFER COMPLETED |
| 2 | OPEN-3 | 2.28GB | 5(3D+1P) | 1-1 | 12 | 5(3D+1P) | 2-1 | TRANSFER COMPLETED |
| 3 | OPEN-3 | 2.28GB | 5(3D+1P) | 1-1 | 13 | 5(3D+1P) | 2-1 | TRANSFER COMPLETED |
| 4 | OPEN-3 | 2.28GB | 5(3D+1P) | 1-1 | 14 | 5(3D+1P) | 2-1 | TRANSFER UNDER WAY |
| 5 | OPEN-3 | 2.28GB | 5(3D+1P) | 1-1 | 15 | 5(3D+1P) | 2-1 | TRANSFER UNDER WAY |

SECURITY TABLE

| LDEV | SECURITY PROCEDURE | WAIT TIME | SCHEDULED TO START | | EXECUTION | | STATUS | LBA DISPLAY (LOGICAL BLOCK ADDRESS) |
|---|---|---|---|---|---|---|---|---|
| | | | DATE | TIME | DATE | TIME | | |
| 1 | SHREDDING | NONE | - | - | 2008/6/9 | 10:00 | COMPLETED | 50 |
| 2 | SHREDDING | NONE | - | - | 2008/6/9 | 10:00 | COMPLETED | 50 |
| 3 | SHREDDING | NONE | - | - | 2008/6/9 | 10:00 | EXECUTING | 10 |
| 4 | SHREDDING | NONE | - | - | 2008/6/9 | 10:00 | EXECUTING | 10 |
| 5 | SHREDDING | NONE | - | - | 2008/6/9 | 10:00 | EXECUTING | 10 |
| 6 | SHREDDING | 2 DAYS | 2008/6/30 | 10:00 | | | WAITING | |
| 7 | SHREDDING | 2 DAYS | 2008/6/30 | 10:00 | | | WAITING | |
| 8 | SHREDDING | 2 DAYS | 2008/6/30 | 10:00 | | | WAITING | |
| 9 | FORMAT LDEV | 5 DAYS | 2008/7/5 | 10:00 | | | WAITING | |
| 10 | FORMAT LDEV | 5 DAYS | 2008/7/5 | 10:00 | | | WAITING | |

| LU PATH MANAGEMENT | SECURITY PROCEDURE | | | | | | | |
|---|---|---|---|---|---|---|---|---|
| LDEV | SECURITY PROCEDURE | WAIT TIME | START SCHEDULE | | EXECUTION | | STATUS | PROGRESS RATIO |
| | | | DATE | TIME | DATE | TIME | | |
| 1 | SHREDDING | NONE | - | - | 2008/6/9 | 10:00 | COMPLETED | 100% |
| 2 | SHREDDING | NONE | - | - | 2008/6/9 | 10:00 | COMPLETED | 100% |
| 3 | SHREDDING | NONE | - | - | 2008/6/9 | 10:00 | EXECUTING | 70% |
| 4 | SHREDDING | NONE | - | - | 2008/6/9 | 10:00 | EXECUTING | 70% |
| 5 | SHREDDING | NONE | - | - | 2008/6/9 | 10:00 | EXECUTING | 70% |
| 6 | SHREDDING | 2 DAYS | 2008/6/30 | 10:00 | | | WAITING | |
| 7 | SHREDDING | 2 DAYS | 2008/6/30 | 10:00 | | | WAITING | |
| 8 | SHREDDING | 2 DAYS | 2008/6/30 | 10:00 | | | WAITING | |
| 9 | FORMAT LDEV | 5 DAYS | 2008/7/5 | 10:00 | | | WAITING | |
| 10 | FORMAT LDEV | 5 DAYS | 2008/7/5 | 10:00 | | | WAITING | |

109

STORAGE SYSTEM HAVING FUNCTION OF PERFORMING FORMATTING OR SHREDDING

The present invention generally relates to a storage system which has a function of performing formatting or shredding.

BACKGROUND OF THE INVENTION

A storage system is known which has a function of deleting data, such as those disclosed, for example, in Patent Documents Japanese Laid-Open Patent Publication 2007-265492; Japanese Laid-Open Patent Publication 2008-27335; and Japanese Laid-Open Patent Publication 2008-90643.

SUMMARY OF THE INVENTION

Now, if a logical storage device within a storage system is left alone and neglected even though it is not being used, then there is a fear of leakage of data which is stored in that logical storage device.

Accordingly an object of the present invention is to reduce the danger of leakage of data which is stored in a logical storage device.

A storage system comprises a detection unit and a security processing unit. The detection unit detects a system change according to which I/O cannot be performed for a first logical storage device, among a plurality of logical storage devices of the storage system. And the security processing unit performs security processing, which is formatting or shredding, upon said first logical storage device, by taking advantage of the opportunity presented by detection of this type of system change.

The first logical storage device may be a substantive logical storage device which is formed on the basis of a physical storage device, or may be a virtual logical storage device which is not based upon any physical storage device. In the latter case, a substantive logical storage device is allocated to the first logical storage device, and data which is to be the subject of I/O for the first logical storage device is stored upon the substantive logical storage device which is assigned to this first logical storage device.

BRIEF DESCRIPTION OF DRAWINGS

FIG. 1 shows an example of the structure of a computer system according to an embodiment of the present invention.

FIG. 2 shows the cooperation between various computer programs, and the relationship between these computer programs and various tables.

FIG. 5A shows an example of the structure of a LDEV table.

FIG. 5B shows an example of the structure of an LU path table.

FIG. 6 shows an example of a LU path management screen.

FIG. 7 shows an example of the structure of a transfer table.

FIG. 9 shows an example of the structure of a security table.

FIG. 10 shows an example of a security management screen.

EXPLANATION OF REFERENCE

Figure 3A:
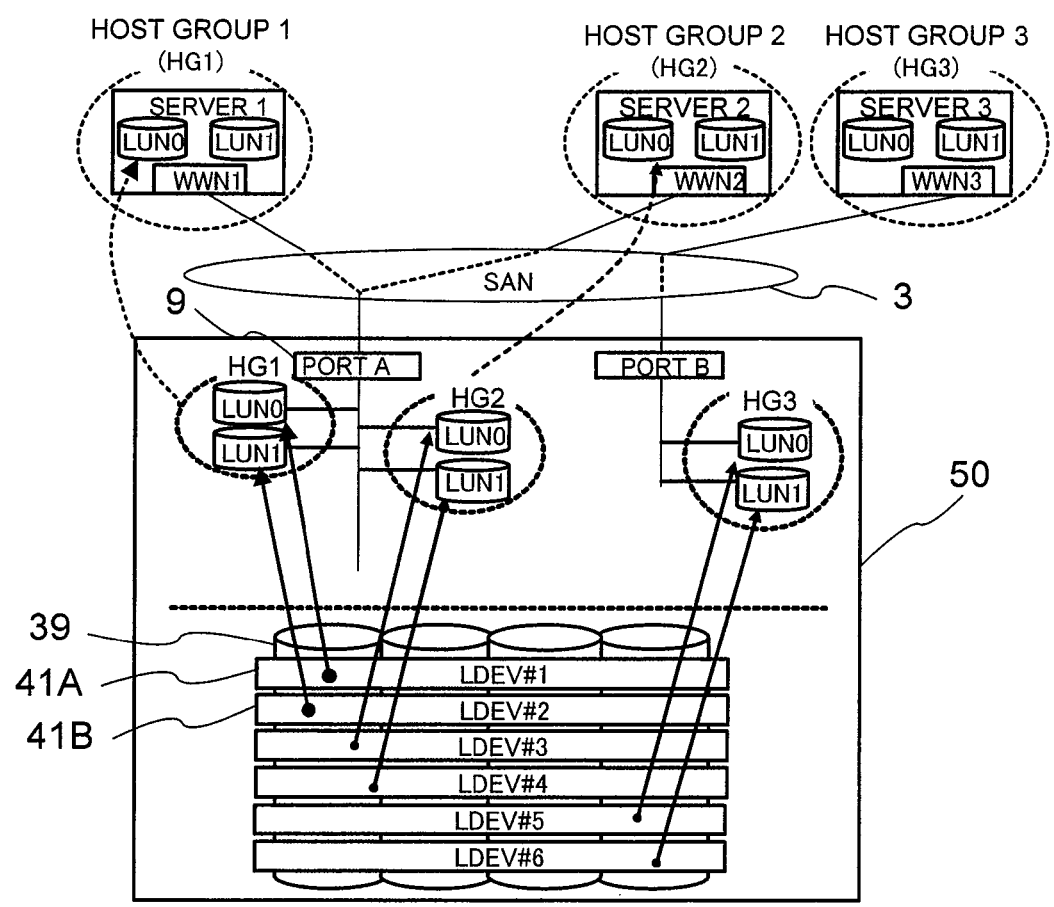
FIG. 3A shows a relationship between LU paths and LDEVs before deletion of a LU path.

35 . . . disk controller
45 . . . disk unit
50 . . . storage system

DETAILED DESCRIPTION OF THE DRAWINGS

An embodiment of the present invention will now be explained with reference to the drawings. It should be understood that, in the following explanation, in order to prevent the explanation becoming redundant, although, when appropriate, processing may be explained with a computer program being taken as the grammatical subject, in actual fact, this processing is performed by a processor which executes the computer program.

FIG. 1 shows an example of the structure of a computer system according to an embodiment of the present invention.

In a communication network (for example a SAN (Storage Area Network)) 3, servers (a server 1 and a server 2) and a storage system 50 are connected. This storage system has a SVP (Service Processor) 17, and a management terminal 5 is connected to the SVP via a LAN (Local Area Network) 7.

The servers 1 and 2 may be, for example, computers having information processing resources such as CPUs (Central Processing Units) and memory and the like, and may be, for example, personal computers, workstations, mainframes, or the like. Although, in this embodiment, only two servers are described, there may be more or fewer of them.

The management terminal 5 is a computer equipped with information processing resources such as those described above, and is a computer for maintaining and managing the storage system 50. This management terminal 5 performs interchange of various types of information with the SVP 17, on the basis of commands from a user who actuates the management terminal 5. Upon receipt of information via the LAN 7, the management terminal 5 outputs this information which it has received as so called visual information to a monitor (not shown in the figures) or the like. By actuating the management terminal 5, for example, the user may perform setting of a hard disk drive 39 (hereinafter termed a HDD) or setting of a logical storage device 41 (hereinafter termed a LDEV) or the like.

The storage system 50 may, for example, be a RAID (Redundant Array of Independent (or Inexpensive) Disks) system which includes a large number of HDDs 39 arranged as in the form of an array. However this is not to be considered as being limitative; the storage system 50, for example, may also be constituted as an intelligent type fiber channel switch which is endowed with high level functions. The storage system 50 may, for example, be divided overall into a disk controller (DKC) 35 and a disk control unit (DKU) 45.

The DKC 35, for example, may comprise channel adapters (CHA) 9, cache memories 11, disk adapters (DKA) 13, switches (SW) 15, the SVP 17, a microprocessor (MP) 19, and a common memory 21. It should be understood that although, for convenience of explanation, in the above description and in the figure, each of the devices denoted by the reference symbols 9, 11, 13, and 17 is shown as being two in number, there may be more or fewer of them.

The CHAs 9 are interface devices which perform data communication with, for example, the servers 1 and 2. These CHAs 9 may, for example, be made as microcomputer systems (for example circuit boards) each of which has a CPU, a memory, a plurality of communication ports which are connected to the servers, and so on.

The cache memories 11 are, for example, volatile (or non-volatile) memories, and temporarily store data which has been received from the server 1 and data which has been read out from a HDD 39.

The DKAs 13 are interface devices which perform data communication with the HDDs 39. Each DKA 13 also, for example, may be made as a microcomputer system (for example a circuit board) which has a CPU, a memory, a plurality of communication ports, and so on.

The SWs 15 mutually connect together the CHAs 9, the cache memories 11, the DKAs 13, the MP 19, and the common memory 21. Each of the SWs 15, for example, may be made as a high speed bus such as a super high speed cross bus switch which performs data transmission by high speed switching operation.

The SVP 17 may, for example, on the basis of an information collection command signal from the management terminal 5, collect various types of information about the storage system 50 via the MP 19. The information which has been collected is outputted to the management terminal 5 via the LAN 7. And, on the basis of an information write command signal from the management terminal 5, the SVP 17 also performs writing of various types of information into the shared memory 21 and so on.

The MP 19 performs various types of processing by executing various computer programs. In concrete terms, for example, a main program 23, a structure management program 25, a transfer program 27, and a security program 29 are executed by the MP 19 (in the figures, "program" is abbreviated as "PG").

The common memory 21 is, for example, a volatile (or a non-volatile) memory, and stores reference information for control of the storage system 50. This stored information may, for example, be structure information 31 and various types of management table 33.

This structure information 31 is information related to the structure of the storage system 50. The structure information 31 may, for example, include information related to which HDDs 39 are included in which RAID groups 37.

As the various types of management table 33, there are an LDEV table 51 (refer to FIG. 5A), an LU (Logical Unit) path table 53 (refer to FIG. 5B), a transfer table 55 (refer to FIG. 7), and a security table 57 (refer to FIG. 9), all of which will be described hereinafter.

A plurality (for example, three) RAID groups 37 are included in the DKU 45. The RAID groups store data according to a predetermined RAID level. Each of the RAID groups 37 consists of two or more HDDS 39. Instead of the HDDs 39, some other type of physical storage device, for example flexible disks, magnetic tapes, semiconductor memory (for example flash memory), optical disks or the like may also be employed. The RAID groups 37 may be so-called parity groups or array groups. One or a plurality of LDEVs 41 are formed on the basis of the storage space in the two or more HDDs 39 which constitute a RAID group 37.

FIG. 2 shows the cooperation between the computer programs described above, and the relationship between the various computer programs and the various tables.

The main program 23 performs I/O for the LDEVs according to I/O (a write command or a read command) from the servers 1 and 2. In concrete terms, for example, the main program 23 writes into a cache memory 11 the write subject data according to the write command which has been received by a CHA 9, and then writes this write subject data via the DKA 13 onto the HDD 39 which supports the LDEV according to this write command. Moreover, for example, in response to a read command which has been received by a CHA 9, the main program 23 reads out the read subject data from the HDD 39 which supports the LDEV according to this read command, writes this read subject data which has been read out into a cache memory 11, and then transmits this read subject data via a CHA 9 to the original server which transmitted the read command.

Furthermore, upon receipt of a command from the management terminal 5, the main program 23 calls the structure management program 25 the transfer program 27, or the security program 29, depending upon the nature of that command. For example, if the main program 23 has received a command to delete or to add a LU path, it calls the structure management program 25; if it has received a transfer command, it calls the transfer program 27; and, if it has received a command for setting a security procedure, it calls the security program 29.

The structure management program 25, for example, refers to the LDEV table 51 or to the LU path table 53, and performs LU path management (for example processing to delete a LU path or processing to assign a new LU path). Furthermore, the structure management program 25 notifies the security program 29 that it has received a request for performing the deletion of an LU path or for the allocation of a new LU path, and receives from the security program 29 the status for the destination LDEV to which the LU path has been assigned. Moreover, the structure management program 25 notifies the main program 23 when processing has been completed.

The transfer program 27, for example, performs updating of the transfer table 55 and data transfer processing (data transfer between the LDEVs 41). The transfer program 27 notifies the security program 29 or the main program 23 when transfer has been completed.

The security program 29 performs, for example, security decisions (updating of the security table 57 and the like), security monitoring (monitoring as to whether security processing is required or not), and security processing. Security processing includes shredding and LDEV formatting. Shredding is processing in which the writing of dummy data to the LDEV is performed a plurality of times, so that the data which is stored in the LDEV is perfectly deleted. On the other hand, formatting a LDEV is processing to write LDEV format data.

The device TOD (Time Of Day) 59 is a device which manages the present date and time. The security program 29 updates the security table 57 on the basis of the present date and time, which it gets from the device TOD 59.

In this embodiment, the opportunity which is taken for performing security processing is performed is when a LU path is deleted, and when data transfer processing is completed (in concrete terms, upon LDEV number switching). In the following, each of these will be explained.

First, the deletion of a LU path will be explained.

As shown in FIG. 3A, one or a plurality of LUNs (Logical Unit Numbers) is assigned to each port 9. Furthermore, a host group is assigned to one or more LUNs. By "host group" is meant a group for classifying the servers which are connected to the various ports of the storage system 50, and hosts with different platforms for each host may be set as a host group. It should be understood that, for setting an LU path, it is necessary to set a host group in advance. When setting the servers 1 and 2 to separate host groups, the WWN (World Wide Name) which is intrinsic to the host bus adapter of the server is assigned, and moreover a correspondence is established between the host group and the LDEV. The I/O from the servers 1 and 2 is controlled by which LUN is assigned to which host group. For example, if the LUNs "0" and "1" which are allocated to the port ID "A" are assigned to the host group 1 of the server 1, then, in the case of the server 1, it is possible to perform I/O to the LDEVs 41A and 41B to which the LUNs "0" and "1" are assigned, whereas in the case of the other server, it is not possible to perform I/O to those LDEVs 41A and 41B.

An LU path is a path from any one of the servers to any one of the LDEVs. In concrete terms, for example, an LU path consists of a port ID, a host group ID, a LUN, and a LDEV number (LDEV #). For example, in FIG. 3A, a first LU path is constituted by the port ID "A", the host group ID "1", the LUN "0", and the LDEV #"1". Due to this, when an I/O command has been received from the server 1 to which the port ID "A" and the LUN "0" are assigned, I/O is performed to the LDEV 41A to which the LDEV #1 is assigned.

Figure 3B:
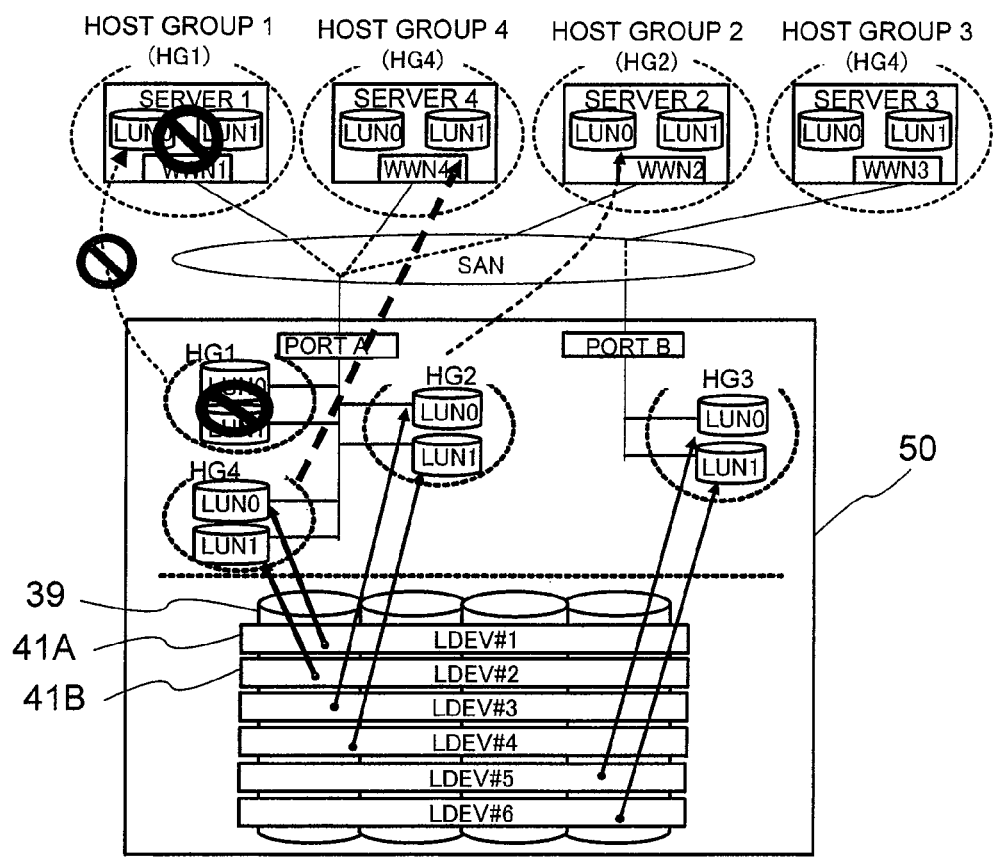
FIG. 3B shows the relationship between the LU paths and the LDEVs after deletion of the LU path.

It will be supposed that, in the structure shown in FIG. 3A, as shown in FIG. 3B, the first LU path which includes the port ID "A" and the LUN "0" and the second LU path which includes the port ID "A" and the LUN "1" are to be deleted. In concrete terms, it will be supposed that the main program 23 receives a delete command for this first and second LU paths from the management terminal 5 and calls the structure management program 25, and, in response to this command, the structure management program 25 deletes the first and second LU paths. In this case, if the LDEVs 41A and 41B, which were assigned to the first and second LU paths, are not assigned to other LU paths, then the structure management program 25 calls the security program 29. And the security program 29 performs security processing upon these LDEVs 41A and 41B.

It should be understood that if, as shown in FIG. 3B, a new LU path is assigned to each of the LDEVs 41A and 41B, and if the LDEVs 41A and 41B match some specified condition (for example, if the status for the LDEVs 41A and 41B is not "waiting" or "executing" as will be described hereinafter), then the structure management program 25 assigns the LDEVs 41A and 41B to that new LU path.

Next, the data transfer processing will be explained.

Figure 4A:
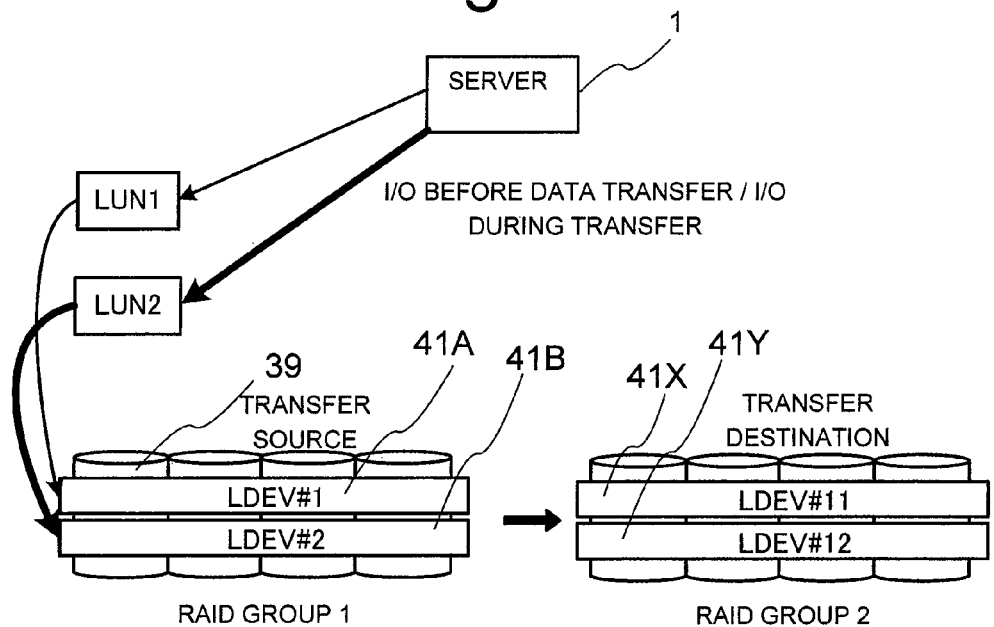
FIG. 4A shows the LDEV number which is assigned to a transfer source LDEV and the LDEV number which is assigned to a transfer destination LDEV, and the destination of I/O from a server, before transfer processing.

As shown in FIG. 4A, it will be supposed that LDEVs 41A and 41B are formed on the basis of a RAID group 1, and that the LDEV #"1" is assigned to the LDEV 41A, while the LDEV "2" is assigned to the LDEV 41B. And the LDEV #"1" is included in a first LU path, while the LDEV #"2" is included in a second LU path. In this case, for example, when an I/O command is received from the server 1 which designates the port ID included in the first LU path and the LUN "1", then I/O is performed for the LDEV 41A.

Furthermore, as shown in FIG. 4A, it will be supposed that LDEVs 41X and 41Y are formed on the basis of a RAID group 2, and that the LDEV #"11" is assigned to the LDEV 41X, while the LDEV "12" is assigned to the LDEV 41Y. And it will be supposed that neither of the LDEV #s "11" and "12" is included in any LU path.

Now, it will be supposed that a transfer command is received from the management terminal 5, in which the transfer source LDEVs and the transfer destination LDEVs are paired, with the LDEVs #"1" and "11" being paired, and the LDEVs #"2" and "12" being paired. In this case, all of the data which is stored upon the LDEV 41A is transferred to the LDEV 41X, and, similarly, all of the data which is stored upon the LDEV 41B is transferred to the LDEV 41Y.

Figure 4B:
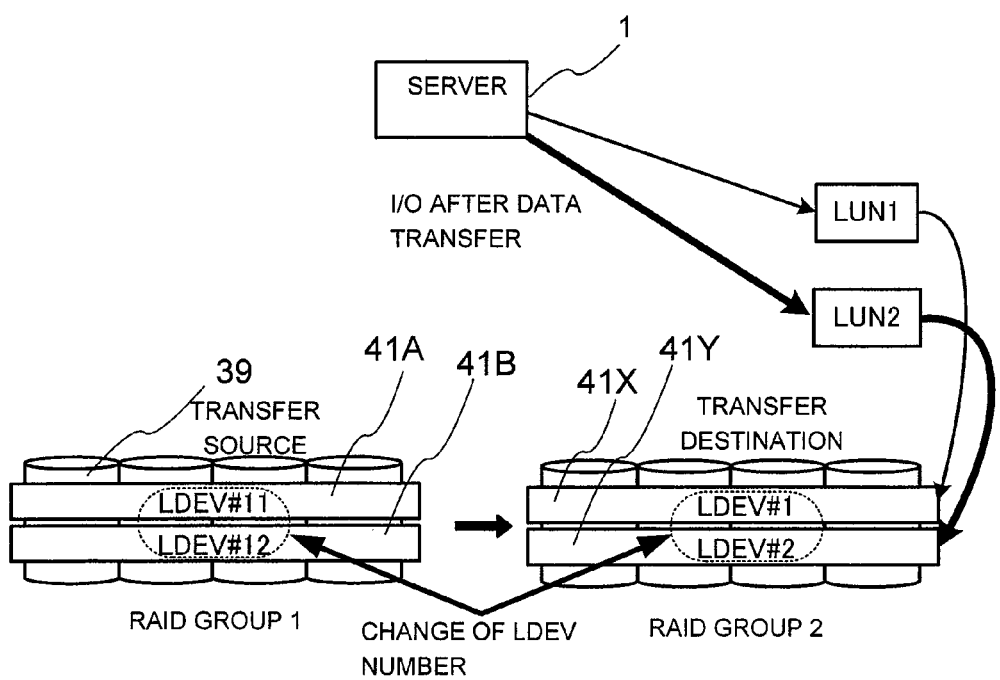
FIG. 4B shows the LDEV number which is assigned to the transfer source LDEV and the LDEV number which is assigned to the transfer destination LDEV, and the destination of I/O from the server, after transfer processing.

When the data transfer is completed (in other words, when the contents of the transfer source LDEV and the transfer destination LDEV become the same), LDEV number switching is performed as shown in FIG. 4B, and thereby the data transfer processing becomes complete. This LDEV number switching consists of interchanging the LDEV numbers which are assigned to the transfer source LDEVs and the LDEV numbers which are assigned to the transfer destination LDEVs. In concrete terms, the LDEV #s "1" ("2") which are assigned to the transfer source LDEVs 41A (41B) are assigned to the transfer destination LDEVs 41X (41Y), and the LDEV #s "11" ("12") which are assigned to the transfer destination LDEVs 41X (41Y) are assigned to the transfer source LDEVs 41A (41B). To put it in another manner, the structure of the first and second LU paths explained by FIG. 4A is not changed. After this LDEV number switching, for example, when an I/O command is received from the server 1 which designates the port ID included in the first LU path and the LUN "1", then I/O is performed for the LDEV 41X.

When the data transfer processing is completed (i.e. when the LDEV number switch has been performed), the security program 29 performs security processing for the transfer sources LDEVs 41A and 41B.

In the above, the data transfer processing has been explained. It should be understood that, in the data transfer processing, it is desirable for the RAID group upon which the transfer source LDEV is based, and the RAID group upon which the transfer destination LDEV is based, to be different. Moreover, it would also be acceptable for the transfer source LDEV and the transfer destination LDEV to be assigned by RAID group units.

In the following, the various tables described above will be explained.

FIG. 5A shows an example of the structure of the LDEV table 51.

This LDEV table 51 is a table in which information related to the LDEVs is recorded. In this LDEV table 51, for each LDEV, there are recorded, for example, the LDEV #, emulation information, capacity information, RAID level information, a RAID group ID (in the figure, under "RAID Gr"), and number of paths information. The capacity information is information which specifies the capacity of the LDEV. The RAID level information is the RAID level of the RAID group which is the basis of the corresponding LDEV. The RAID group ID is the ID of the RAID group which is the basis of the corresponding LDEV. And the number of paths information specifies the number of LU paths which are allocated to the corresponding LDEV. If "0" is shown as the number of paths information, this means that no LU path is assigned to the LDEV which corresponds to this information; while, if the path information is specified as being an integer greater than "0", this means that at least one LU path is assigned to the LDEV which corresponds to this information.

FIG. 5B shows an example of the structure of the LU path table 53.

The LU path table 53 is a table in which information related to the LU paths is recorded. In this LU path table 53, for each LU path, there are recorded, for example, the port ID, the host group ID, the LUN, the LDEV #, emulation information, capacity information, RAID level information, a RAID group ID, and number of alternate paths information. In this embodiment, as previously described, the LU path is defined by the port ID, the host group ID, the LUN, and the LDEV #. The capacity information, the RAID level information, the RAID group ID, and the alternate path information are set on the basis of the information which is specified from the LDEV table 51. The number of alternate paths information is information which specifies the number of LU paths, among the plurality of LU paths which are assigned to the corresponding LDEV, other than some one LU path (i.e. alternate paths). If damage to that one LU path has occurred, then, via any one of those alternate paths, I/O for the LDEV to which that alternate path is assigned becomes possible.

The LU paths can be set by the user from a LU path management screen which is displayed upon the management terminal 5.

FIG. 6 shows an example of the LU path management screen.

This LU path management screen 91 is a GUI (Graphical User Interface), and is displayed upon the monitor of the management terminal 51 in response to a command for displaying the LU path management screen which is issued by the user actuating the management terminal 5 while the main program 23 is started. Via this LU path management screen, for example, it is possible to command deletion of a LU path which is assigned to a user desired LDEV, to allocate a LU path to a user desired LDEV, to command setting of security processing procedure for a user desired LDEV, or the like.

The security procedure setting field 92 is a field for setting what type of security processing is to be executed for a user desired LDEV (in other words, whether shredding is to be executed, whether LDEV formatting is to be executed, or whether nothing is to be done, and, if some procedure is to be executed, after how many days it is to be executed from when that user desired LDEV has ceased to be used, or the like). In the shown screen example, the setting is made to perform shredding after one day has elapsed from when the user desired LDEV ceases to be used by being deleted from the LU path.

The LU path list 93 is a list of information related to the LU paths, which is displayed on the basis of the LU path table 53. On the other hand, the LDEV list 95 is a list of information related to the LDEVs, which is displayed on the basis of the LDEV table 51.

If a desired LU path is selected upon the LU path list 93 and the "delete LU path" button 97 is depressed, then the LDEV # which corresponds to the LUN within this LU path is deleted from the list 93. In this case, the number of paths for the LDEV which corresponds to this LDEV 3 is decremented by 1. Deletion of the LU path is performed in the above manner. It should be understood that, instead of this method, it would also be acceptable for an LU path to be deleted by some other method (for example, by a method in which the host group ID within the LU path is deleted). In other words, in this embodiment, "delete LU path" means that the relationship between the port ID, the host group ID, the LUN, and the LDEV # which are included in that LU path is destroyed; or, to put it in another manner, that deletion (including change) of any one among those elements is performed.

On the other hand, if a LUN to which no LDEV # is assigned is selected upon the LU path list 93, and a desired LDEV # is selected upon the LDEV list 95, and the "add LU path" button 99 is depressed, then the LDEV which has been designated (and the other information corresponding thereto, such as the capacity information and the like) is set up in the LU path list 93 in correspondence to the LUN which has been designated. Moreover, in the LDEV list 95, the number of paths which corresponds to the selected LDEV # is incremented by 1. Addition of a new LU path to a LDEV is performed in the above manner. In other words, in this embodiment, "addition of a new LU path" means building of a new relationship between a port ID, a host group ID, a LUN, and a LDEV #. It should be understood that addition of a new LU path is not performed if the status of the LDEV which is the target of addition is "waiting" or "executing", as will be described hereinafter.

FIG. 7 shows an example of the structure of the transfer table 55.

In the transfer table 55, there is recorded information related to the transfer source LDEVs and the transfer destination LDEVs, which constitute pairs. In this transfer table 55, as information related to the transfer source LDEVs, for each transfer source LDEV, there are recorded, for example, the LDEV #, emulation information, capacity information, RAID level information, and the RAID group ID. Furthermore, in the transfer table 55, as information related to the transfer destination LDEVs, for each transfer destination LDEV, there are recorded, for example, the LDEV #, RAID level information, and the RAID group ID. Moreover, in the transfer table 55, there is also recorded, in pairs, status information which specifies a status related to data transfer processing. This status, for example, may be "transfer completed" or "transfer proceeding".

The transfer table 55 may be updated, for example, on the basis of information which is set from a data transfer management screen which is displayed upon the management terminal 5.

Figure 8:
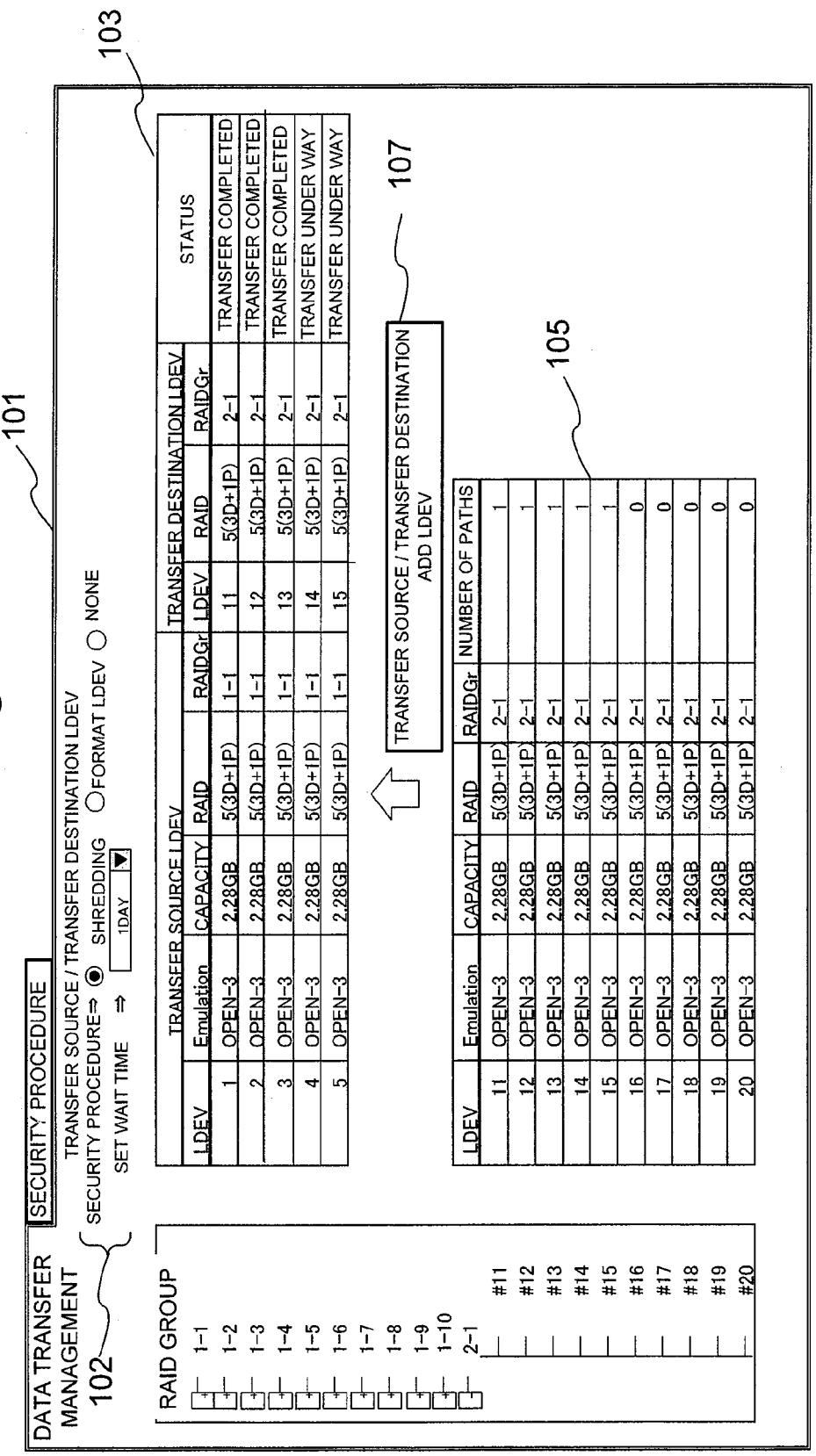
FIG. 8 shows an example of a data transfer management screen.

FIG. 8 shows an example of the data transfer management screen.

This data transfer management screen 101 is a GUI, and, for example, is displayed upon the monitor when the user issues a command for data transfer by actuating the management terminal 5 while the main program 23 is started. Via this data transfer management screen 101, for example, a transfer source LDEV and a transfer destination LDEV may be designated, or setting of security processing for a transfer source LDEV may be commanded.

The security procedure setting field 102 is a field for setting what type of security processing is to be executed for the transfer source LDEV (in other words, whether shredding is to be executed, whether LDEV formatting is to be executed, or whether nothing is to be done, and, if some procedure is to be executed, after how many days it is to be executed from when that user desired LDEV has ceased to be used, or the like). In the shown screen example, the setting is made to perform shredding upon the transfer LDEV after one day has elapsed from when the data transfer processing is completed.

The transfer list 103 is a list of information related to the transfer source LDEVs and the transfer destination LDEVs, displayed on the basis of the transfer table 55. And an addition candidate list 105 is a list of information related to addition candidate LDEVs which is displayed on the basis of the LDEV table 51. By an "addition candidate LDEV" is meant a LDEV which can be added as a transfer source or as a transfer destination, or, to put it in another manner, a LDEV other than one which corresponds to "transfer under way" in the transfer table 55. If, in the addition candidate list, LDEVs are selected for a transfer source and a transfer destination as desired by the user, and the "add" button 107 is pressed, then information related to the LDEVs which have been designated is added to the transfer table 55, and moreover is also added to the transfer list 103.

FIG. 9 shows an example of the structure of the security table 57.

Information related to the security of each of the LDEVs is recorded in the security table 57. In this security table 57, for each LDEV, there are recorded, for example, the LDEV #, security procedure information, WAIT time information, scheduled start date and time information, execution date and time information, status information, and LBA (Logical Block Address) display information.

The security procedure information is information which specifies the type of securing processing (shredding or LDEV formatting).

The WAIT time information is information which specifies the WAIT time from when the LDEV ceased to be used. "The LDEV ceasing to be used", in this embodiment, is either of (9-1) and (9-2) below:
(9-1) no LU path being assigned the LDEV, due to deletion of an LU path;
(9-2) upon a data transfer being completed, the LDEV # which was assigned to the transfer destination LDEV has been assigned to the LDEV instead of the LDEV # which was assigned to the transfer source LDEV before transfer.

The scheduled start date and time information is information which specifies the scheduled date and time for starting security processing. This scheduled start date and time are determined by adding the WAIT time specified by the WAIT time information to the current date and time at the time point that the LDEV ceased to be used, acquired from the device TOD 59.

The execution date and time information is information which specifies the start date and time for execution of the security processing.

The status information is information which specifies a status related to the security processing. For example, there may be three types for this status: "completed", "executing", and "waiting".

The LBA display information is information for an address range which corresponds to an LDEV, which specifies the block LBAs (the storage regions which constitute the LDEV) upon which security processing is to be executed. In this embodiment, the security processing is performed sequentially from the head end LBA of the LDEV to its final end LBA. It is possible to specify the state of progress of the security processing for an LDEV in percent or the like, on the basis of the capacity information of the LDEV and its LBA display information. This state of progress is displayed upon the security management screen.

FIG. 10 shows an example of the security management screen.

The security management screen 109 is a GUI, and, for example, is displayed upon the monitor when the user issues a command for security management display by actuating the management terminal 5 while the main program 23 is started. Via this security management screen 109, for example, information based upon the security table 57 may be displayed. In concrete terms, for example, on this security management screen 109, the information other than the progress ratio is information which is recorded in the security table 57, and the progress ratio for each LDEV is a value which is calculated on the basis of the capacity information and the LBA display information of the LDEV.

By referring to this security management screen 109, the user is able to ascertain how the security procedure situation is progressing for each of the LDEVs. For example, on the shown sample screen, it is understood that, for LDEV 1, shredding was started at 10:00 on 2008/6/9, and that this shredding has been completed. Furthermore it is understood that, for LDEV 3, shredding was started at 10:00 on 2008/6/9, and this shredding is completed up to 70%. Moreover it is understood, for example, that for LDEV 9 the start schedule for LDEV formatting is 10:00 on 2008/7/5.

In the following, the flow of processing performed in this embodiment will be explained.

Figure 11:
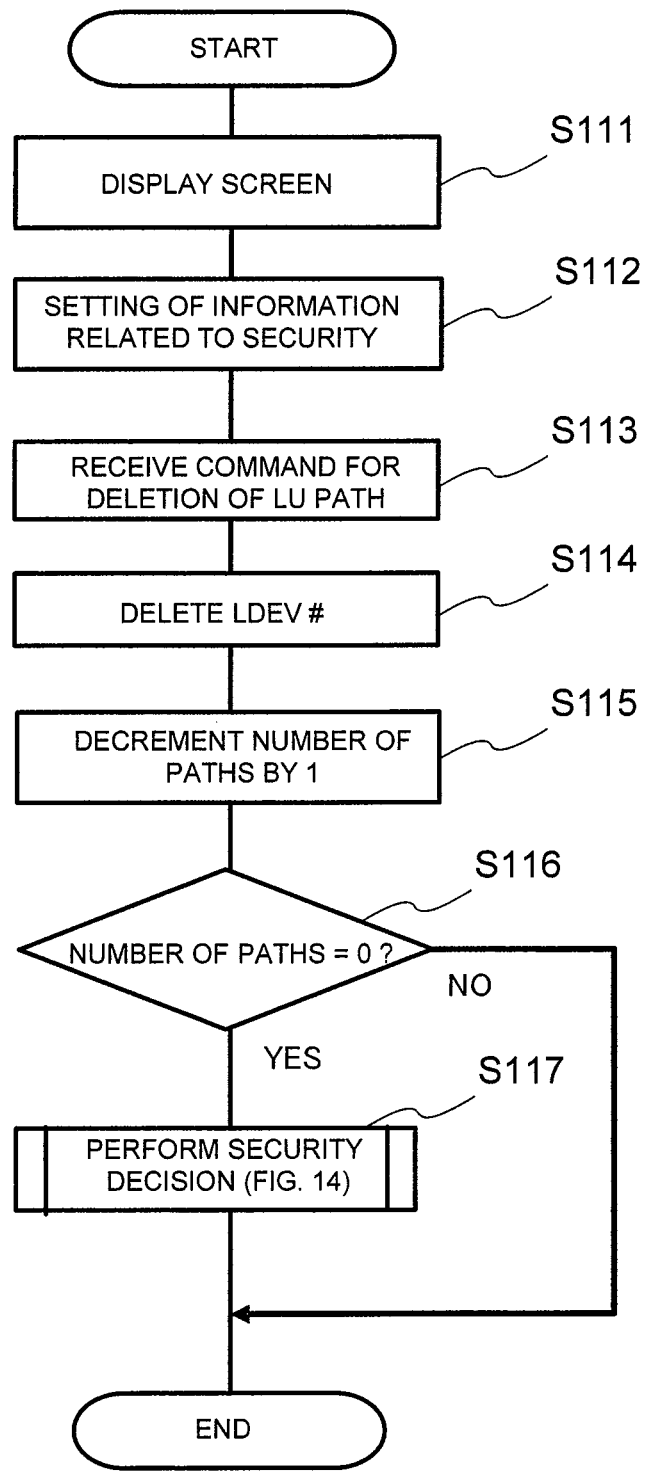
FIG. 11 shows the flow of processing to delete an LU path.

FIG. 11 shows the flow of processing for deleting a LU path.

The structure management processing program 25 displays the LU path management screen 91 (refer to FIG. 6) (a step S111). And, via this LU path management screen 91, the structure management program 25 may receive (a step S112) selection of an LU path which is to be deleted, or setting of information related to security of a LDEV which is assigned to an LU path which is to be deleted (the type of the security procedure (shredding, LDEV formatting, or nothing to be done), and how long the WAIT time is to be).

In a step S113, the structure management program 25 receives a delete command for the LU path which has been selected (by depression of the LU path delete button 97).

And, in response to this command received in the step S113, the structure management program 25 deletes from the LU path table 53 the LDEV # which is included in the above described LU path which has been selected (a step S114), and decrements the number of paths which corresponds to the LDEV of this LDEV # (hereinafter referred to as the "subject LDEV" in the explanation of FIGS. 11, 14, and 16) (i.e. the number of paths recorded in the LDEV table 51) by 1 (a step S115).

Figure 14:
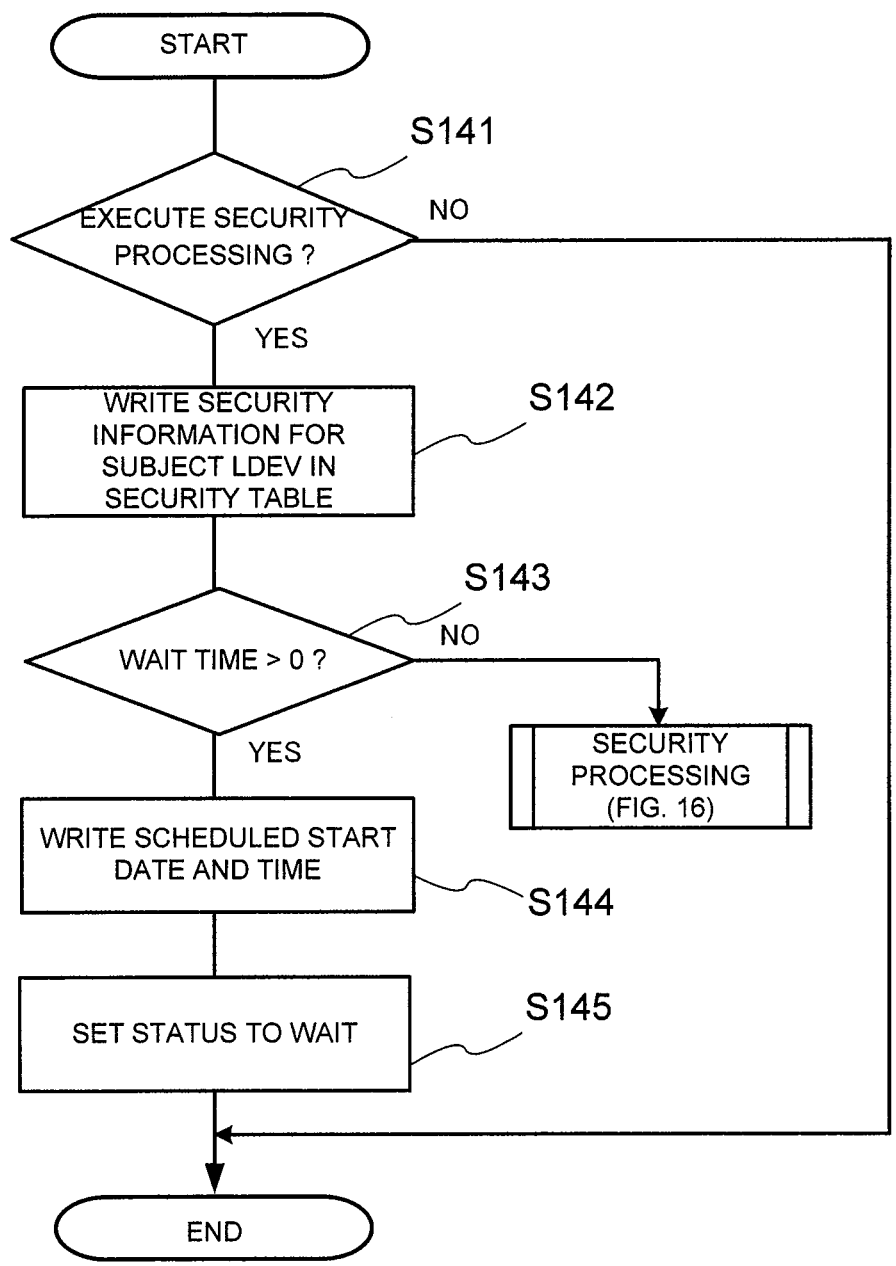
FIG. 14 shows the processing flow of security decision.

If the result of the step S115 is that the number of paths for the subject LDEV has become 0 (YES in a step S116), then the security decision of FIG. 14 is performed according to a command from the structure management program 25 to the security program 29.

On the other hand, if the result of the step S115 is that the number of paths for the subject LDEV is not 0 (NO in the step S116), then, since there is a possibility that I/O is being performed with the subject LDEV via another LU path, accordingly the security decision of FIG. 14 is not performed, but instead this processing flow terminates.

Figure 12:
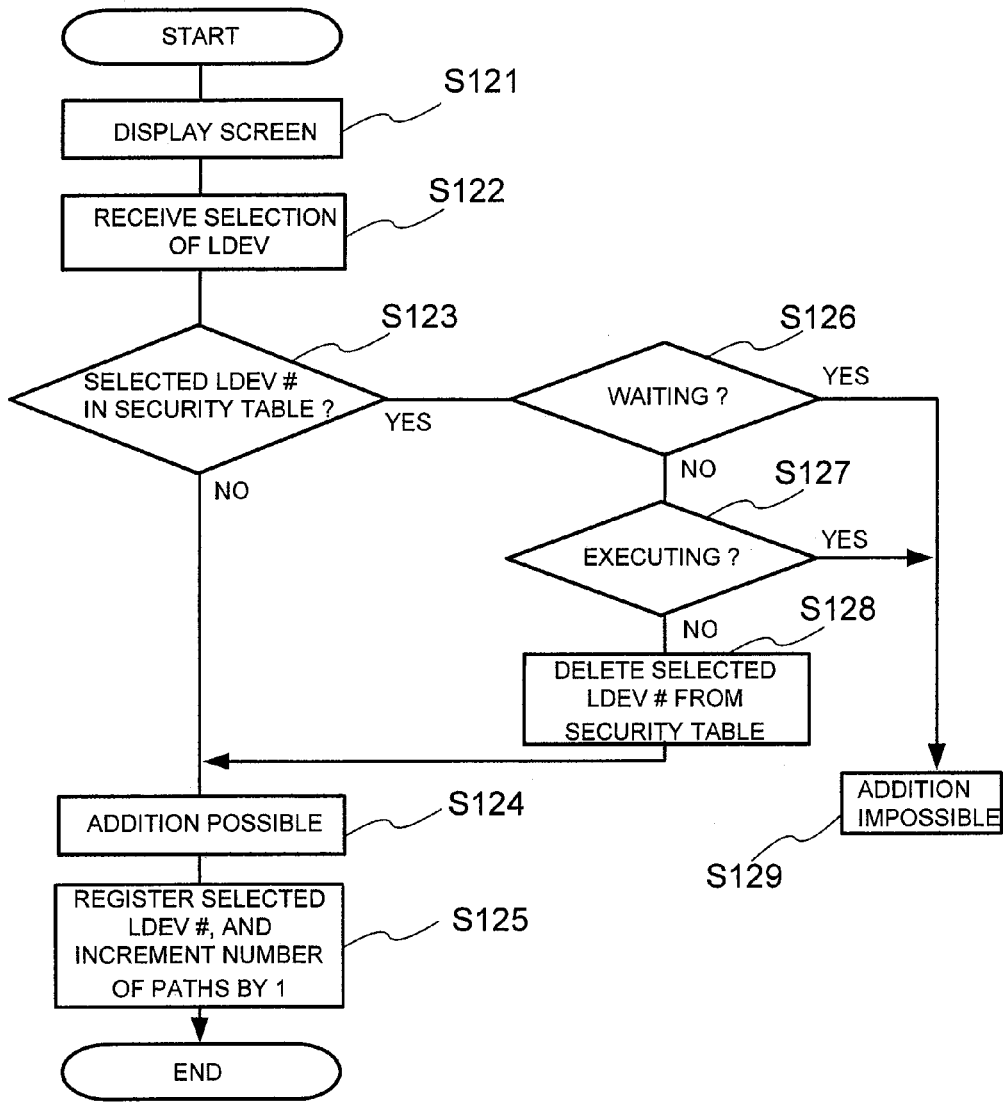
FIG. 12 shows the flow of processing to assign a new LU path.

FIG. 12 shows the flow of processing for allocating a new LU path.

The structure management program 25 displays the LU path management screen 91 (refer to FIG. 6) (a step S121). And, via this LU path management screen 91, the structure management program 25 may receive (a step S122) registration of a host group for each port, and moreover may receive selection of an LDEV # to be assigned to any user desired LUN. In the following explanation of FIG. 12, the LDEV # which has been selected will be termed the "selected LDEV #".

Next, the structure management program 25 queries the security program 29 as to whether or not the selected LDEV # is recorded in the security table 57 (a step S123).

If the result of the step S123 is negative (NO in the step S123), then the structure management program 25 performs addition possible processing (for example processing to enable the "add LU path" button 99) (a step S124). Moreover, the structure management program 25 establishes a correspondence between the selected LDEV # and the user desired LUN in the LU path table 53, and also increments the number of paths corresponding to the selected LDEV # in the LDEV table 51 by 1 (a step S125).

On the other hand, if the result of the step S123 is affirmative (YES in the step S123), then the structure management program 25 queries the security program 29 for the security status corresponding to the selected LDEV #, and decides whether or not the security status which has been received in response is "waiting" (a step S126). If the result of the step S126 is negative (NO in the step S126), then the structure management program 25 decides whether or not the security status which has been received in response is "executing" (a step S127). If the result of the step S127 is also negative (NO in the step S127), then the structure management program 25 orders the security program 29 to delete the record which includes the selected LDEV from the security table 57 (a step S128).

On the other hand, if the result of either one of the steps S126 and S127 is affirmative (YES in the step S126 or the step S127), then the structure management program 25 performs addition impossible processing (for example, processing to disable the "add LU path" button 99) (a step S129).

Figure 13:
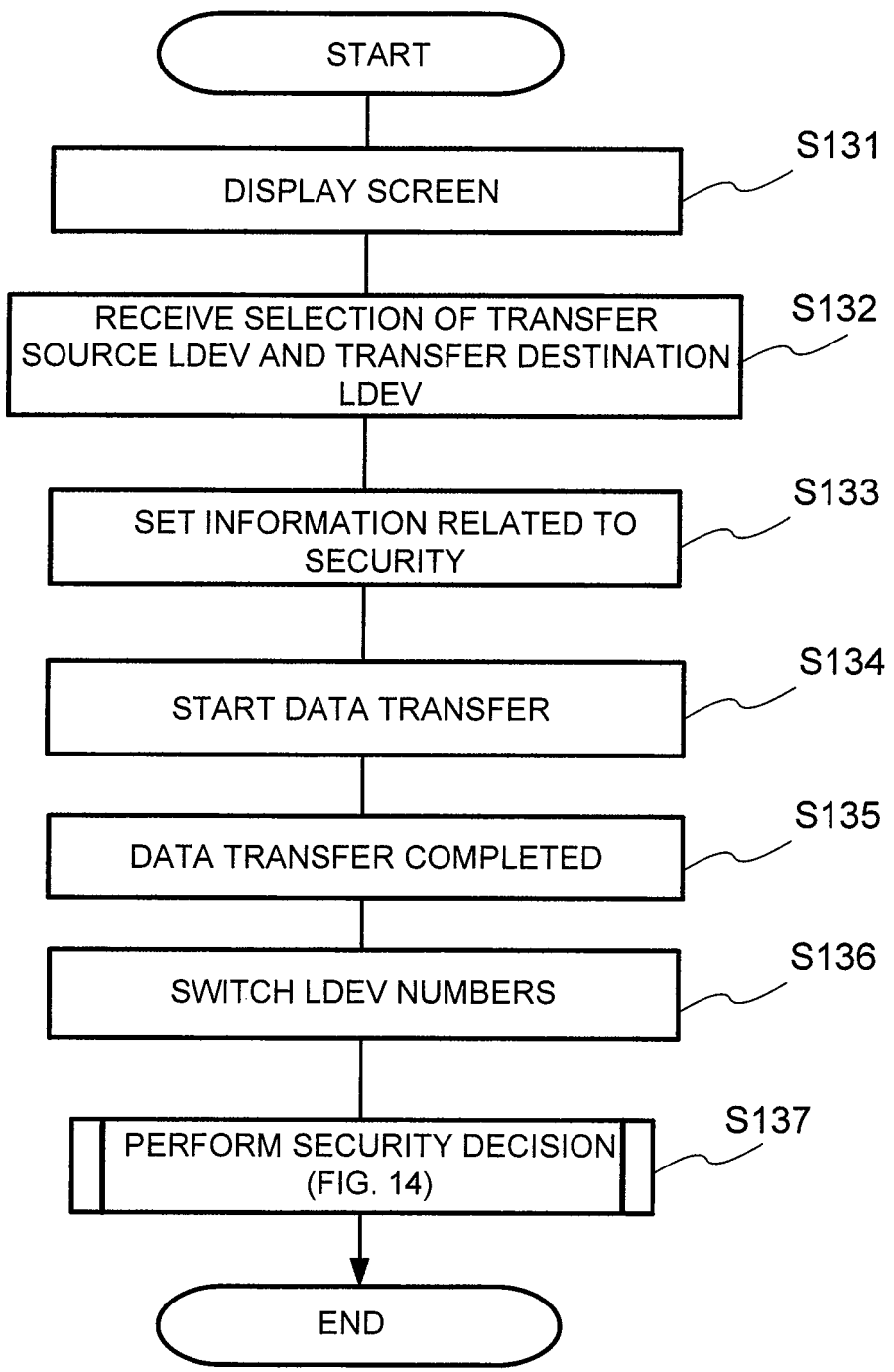
FIG. 13 shows the flow of data transfer processing.

FIG. 13 shows the flow of processing for data transfer.

The transfer program 27 displays the data management screen 101 (refer to FIG. 8) (a step S131). And the transfer program 27 receives selection of the transfer source LDEV and the transfer destination LDEV (a step S132). Moreover, the transfer program receives setting of information related to security for the transfer source LDEV (the type of security processing and the WAIT time) (a step S133).

And the transfer program 27 starts data transfer from the transfer source LDEV to the transfer destination LDEV (a step S134). When transfer of all of the data has been completed (a step S135), the transfer program 27 performs the LDEV number switching described previously (a step S136). When the LDEV number switching has been completed, then, according to a command from the transfer program 27 to the security program 29, the security decision shown in FIG. 14 is performed taking the transfer source LDEV as the subject LDEV (a step S137).

FIG. 14 shows the flow of processing for security decision.

The security program 29 decides whether or not to execute security processing (a step S141). In concrete terms, the security program 29 decides whether, in the security information for the subject LDEV, the type of security processing (i.e. the security procedure) is shredding or LDEV formatting.

If the result of the step S141 is affirmative (YES in the step S141), then the security program 29 writes the security information for the subject LDEV in the security table 57 (a step S142).

Figure 16:
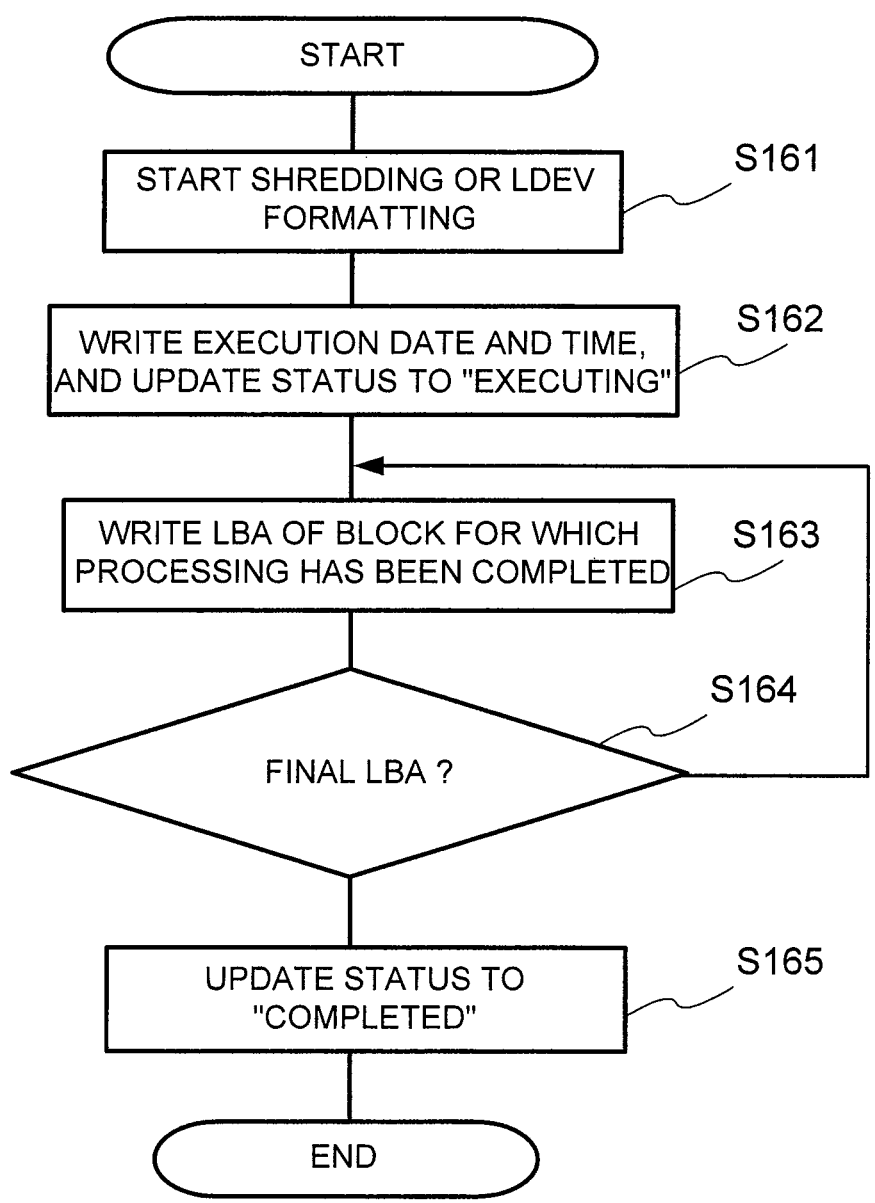
FIG. 16 shows the processing flow of security processing.

If the WAIT time in this security information is 0 (none) (NO in a step S143), then the security program 29 performs the security processing shown in FIG. 16, while, if this WAIT time is greater than 0 (YES in the step S143), then it executes the steps S144 and S145. In other words, the security program 29 writes the scheduled start date and time, which are calculated by adding the current date and time to the WAIT time, into the security table 57 for the subject LDEV (a step S144), and moreover updates the status information for the subject LDEV to "waiting" (a step S145).

Figure 15:
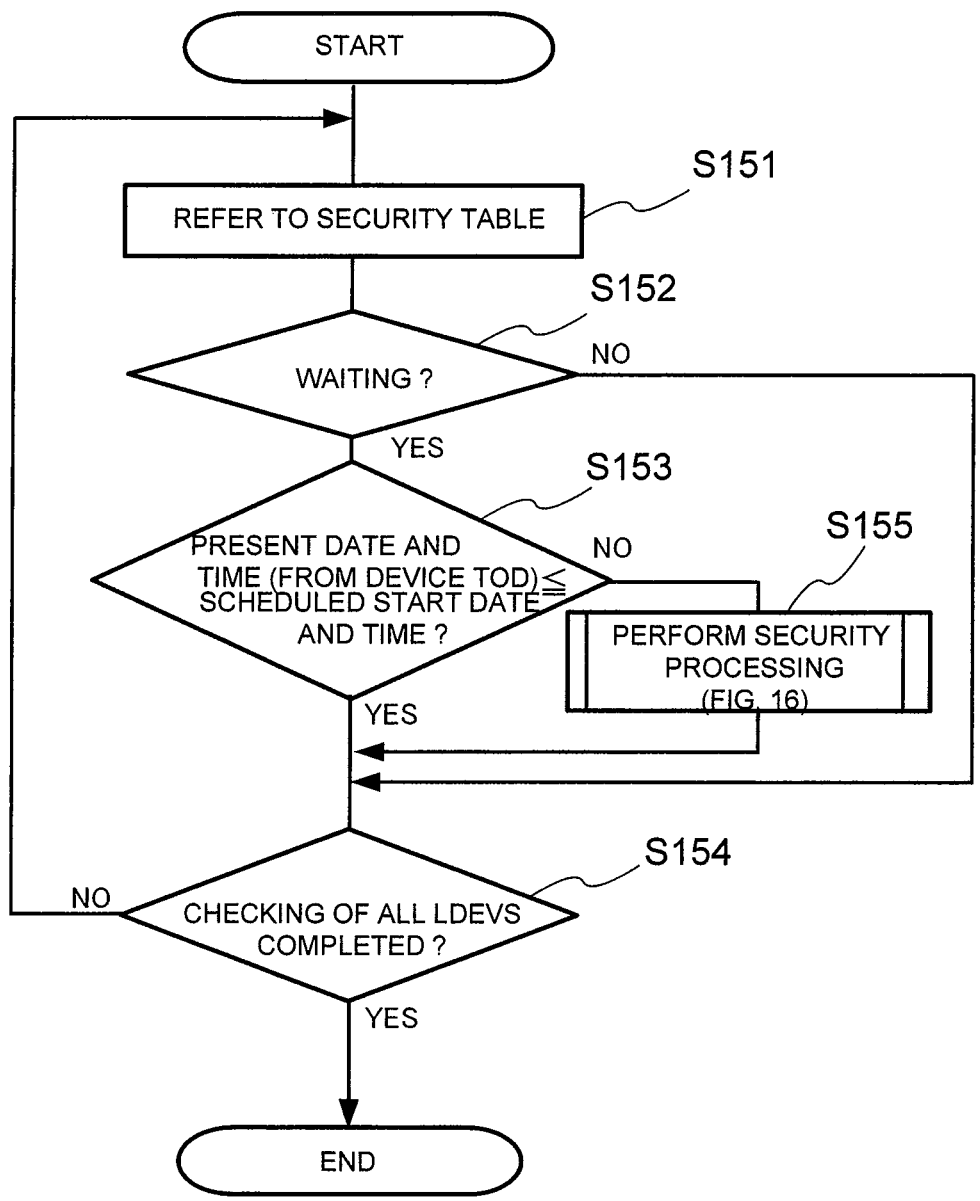
FIG. 15 shows the processing flow of security monitoring.

FIG. 15 shows the flow of processing for security monitoring. This processing flow is started periodically.

The security program 29 refers to one record among the records in the security table which have not been referred to (a step S151). And, if the status information in this record is "waiting" (YES in a step S152), then the security program 29 decides whether or not the scheduled start date and time are after the present date and time (a step S153). If the result of the step S153 is negative (NO in the step S153), then the security program 29 executes the security processing shown in FIG. 16 (a step S155).

If the result of the step S152 is negative (NO in the step S152) or the result of the step S153 is affirmative (YES in the step S153), then the security program 29 decides whether or not all of the records in the security table 57 have been referred to (a step S154), and if the result of the step S154 is negative (NO in the step S154), then the flow of control loops back to execute the step S151 again.

FIG. 16 shows the flow of security processing. In the explanation of this figure, "subject LDEV" is an LDEV which has ceased to be used; in concrete terms, it is an LDEV for which an LU path is deleted and no other LU path is assigned, or a transfer source LDEV.

The security program 29 starts security processing for the subject LDEV, starting from the block which corresponds to the head end LBA of that subject LDEV (a step S161). By "security processing for the subject LDEV" is meant the type of security processing which is specified by the security procedure information corresponding to the subject LDEV, specified from the security table 57, and in concrete terms this is shredding or LDEV formatting.

And the security program 29 writes the execution date and time for the subject LDEV into the security table 57, and moreover updates the status for the subject LDEV to "executing" (a step S162).

The security program 29 then writes the LBA of the block for which security processing has been completed in the LBA display information for the subject LDEV (a step S163).

If the LBA which has been written in the step S163 is not the final LBA of the subject LDEV (NO in the step S164), then the security program 29 performs the security processing for the block of the next LBA.

On the other hand, if the LBA which was written in the step S163 is the final LBA of the subject LDEV (YES in the step S164), then the security program 29 updates the status information for the subject LDEV in the security table 57 to "completed" (a step S165).

According to the embodiment described above, upon detection of an LDEV which has ceased to be used, that opportunity is automatically taken advantage of for performing security processing, i.e. shredding or LDEV formatting, upon that LDEV. By doing this, it is possible to reduce the danger of undesirable leakage of the data which is stored upon that LDEV (for example, of it being read by some server other than the one upon which that data was written).

Furthermore, according to the embodiment described above, when an LDEV which has ceased to be used is not used within some period of time, then, by setting a WAIT time on the basis of this time period, it is possible to arrange for security processing not to be performed upon that LDEV immediately after it has ceased to be used. For this reason, the convenience of use from the point of view of the user is enhanced.

Although a preferred embodiment of the present invention has been explained above, the present invention is not to be considered as being limited to this embodiment; it goes without saying that various changes may be made to the present invention within its range, provided that its gist is not deviated from.

For example, the LDEVs mentioned are not limited to being substantive LDEVs which are based upon physical storage devices; it would also be acceptable for them to be virtual LDEVs. Such virtual LDEVs may be LDEVs to which pool LDEVs are assigned (LDEVs according to Thin Provisioning), or may be LDEVs which are mapped to LDEVs which are based upon physical storage devices within a storage system which is external to the storage system 50.

Furthermore, for example, it would also be acceptable, as the LDEV #, for there to be a first type of LDEV # which is fixedly assigned to one LDEV, and a second type of LDEV # whose assigned destination is changed by an LDEV number switch or the like. In this case, it would be possible to specify a transfer source LDEV by using the first type of LDEV #.

Moreover, for example, the WAIT time could also be a time which is determined automatically, instead of being a time as desired by the user. For example, it would be acceptable for the main program 23 to manage an I/O history for each LDEV (for example, the number of times of I/O per unit time (for example, in one day, one week, or one month), and for the structure management program 25 and/or the transfer program 27 to determine (in cooperation with the main program 23) a WAIT time (for example, a time in units of one day, one week, or one month) for the subject LDEV (an LDEV for which an LU path is deleted and no other LU path is established, or a transfer source LDEV) on the basis of this I/O history, and to set this value which has been determined as the WAIT time.

The invention claimed is:

1. A storage system which receives from a computer, a first input/output (I/O) command, designating a first port ID and a first logical unit, the storage system comprising:
a plurality of ports, including a port to which said first port ID is assigned and which receives said first I/O command;
a plurality of logical storage devices, including a first logical storage device corresponding to a first logical ID which is assigned to said first logical unit of a plurality of logical units provided to the computer, each of the plurality of logical storage devices storing data the computer accesses,
wherein one or more of the plurality of logical units is assigned to each of the plurality of logical storage devices, and
wherein when more than one of the plurality of logical units are assigned to said first logical storage device, there are a plurality of paths formed between said first logical storage device and each of the plurality of logical units assigned to said first logical storage device;
an I/O control unit which, in response to said first I/O command, performs I/O for said first logical storage device;
a memory which stores a path table, the path table comprising a number indicating an amount of the plurality of paths formed between said first logical storage device and each of the plurality of logical units assigned to said first logical storage device;
a structure management processing unit that receives a delete command to delete a path of the plurality of paths, and in response to the delete command, deletes the path and decrements the number of the plurality of paths in the path table by 1;
a detection unit which detects a system change according to which I/O for said first logical storage device cannot be performed;
a security processing unit, which by taking advantage of an opportunity presented by detection of said system change, performs security processing, which is formatting or shredding, upon said first logical storage device,
wherein the opportunity to perform the formatting or shredding is taken when the number of the plurality of paths becomes 0, which indicates that each of the plurality of paths formed between said first logical storage device and the plurality of logical units assigned to said first logical storage device is deleted, and
wherein the data stored in the first logical storage device is deleted by formatting or shredding.

2. A storage system according to claim 1,
wherein the memory further stores a security table, the storage system further comprising:
a plurality of Redundant Array of Independent (or Inexpensive) Disks (RAID) groups including a first RAID group and a second RAID group;
a path management unit which manages the plurality of paths; and
a transfer unit which transfers data from said first logical storage device to a second logical storage device corresponding to a second logical ID,
wherein each RAID group is constituted by a plurality of physical storage devices,
wherein in said security table, for each logical storage device, there are recorded a security processing type which specifies which of shredding and formatting is to be executed, and a status related to said security processing,
wherein each of the logical storage devices is based upon a RAID group of the plurality of RAID groups,
wherein the second logical storage device corresponding to the second logical ID is included in said plurality of logical storage devices, and is not assigned to any of said plurality of logical units,
wherein said first RAID group is the basis of said first logical storage device,
wherein said second RAID group is the basis of said second logical storage device,
wherein each path of the plurality of paths includes the ID of a port of said plurality of ports, a logical unit of said plurality of logical units, and a logical ID of a plurality of logical IDs which are assigned to the logical storage devices,
wherein said path management unit performs deletion of a first path which includes said first port ID, said first logical unit, and said first logical ID,
wherein if the transfer of data from said first logical storage device to said second logical storage device has been completed, said transfer unit performs logical ID switching processing,
wherein in said logical ID switching processing, said first logical ID which was assigned to said first logical storage device which was the data transfer source is assigned to said second logical storage device which was the data transfer destination, while on the other hand said second logical ID which was assigned to said second logical storage device which was the data transfer destination is assigned to said first logical storage device which was the data transfer source, and thereby, if an I/O command which designates said first path is received after the completion of transfer of said data, I/O comes to be performed for said second logical storage device,
wherein said system change is deletion of said first path, and said logical ID switching processing, and
wherein said security processing unit:
(2-1) if deletion of said first path is detected before the transfer of said data, and if no other path is assigned to said first logical storage device: refers to said security table, specifies the security processing type which corresponds to said first logical storage device, and performs security processing of the specified security processing type upon said first logical storage device; while, on the other hand, it does not perform said security processing upon said first logical storage device, if another path is assigned to said first logical storage device; and
(2-2) if said logical ID switching processing is detected before deletion of said first path: refers to said security table, specifies the security processing type which corresponds to said first logical storage device, and performs upon said first logical storage device security processing of the specified security processing type corresponding to said first logical storage device.

3. A storage system according to claim 2,
wherein said security processing unit, while performing said security processing upon said first logical storage device, updates the status corresponding to said first logical storage device in said security table to a status which denotes "executing", and
wherein said path management unit, upon receipt of a command from the user for new assignment, which is assignment of a new path to said first logical storage device, refers to said security table, and does not execute said new assignment, if the status corresponding to said first logical storage device is the status which denotes "executing".

4. A storage system according to claim 3,
wherein for at least one among said plurality of logical storage devices, information is recorded in said security table which specifies a data storage time period from when said system change is detected,
wherein said security processing unit, when said system change for said first logical storage device has been detected, if said data storage time period is set in correspondence to said first logical storage device, updates the status in said security table corresponding to said first logical storage device to a status which denotes "waiting",
wherein during said data storage time period which corresponds to said first logical storage device, the status for said first logical storage device is the status which denotes "waiting",
wherein said security processing unit, when said system change has been detected, refers to said security table, specifies the status which corresponds to said first logical storage device, and does not perform said security processing upon said first logical storage device if the specified status is the status which denotes "waiting", and
wherein said path management unit, upon receipt from the user of a command for said new assignment, does not execute said new assignment if the status which corresponds to said first logical storage device is the status which denotes "waiting".

5. A storage system according to claim 4,
wherein said security processing unit performs said security processing sequentially from the storage region which corresponds to the head address of the logical storage device which is the subject of said security processing, to the storage region which corresponds to its final end address,
wherein in said security table, a progress address is recorded by said security processing unit for each logical storage device, specifying up to what address said security processing has been performed, and
wherein said security processing unit calculates the state of process of said security processing upon said first logical device on the basis of the address space of said first logical device and said progress address corresponding to said first logical storage device, and transmits information for displaying the state of progress which has been calculated to a computer used by said user.

6. A storage system according to claim 1, further comprising:
a path management unit which manages the plurality of paths,
wherein each path includes the ID of a port of said plurality of ports, a logical unit of said plurality of logical units, and a logical ID of a plurality of logical IDs which are assigned to the logical storage devices,
wherein said path management unit performs deletion of said first path,
wherein said system change is deletion of said first path, and
wherein said security processing unit, if deletion of said first path is detected, and if no other path is assigned to said first logical storage device, performs said security processing upon said first logical storage device; while, on the other hand, it does not perform said security processing upon said first logical storage device, if another path is assigned to said first logical storage device.

7. A storage system according to claim 1, further comprising:
a plurality of Redundant Array of Independent (or Inexpensive) Disks (RAID) groups including a first RAID group and a second RAID group; and
a transfer unit which transfers data from said first logical storage device to a second logical storage device corresponding to a second logical ID,
wherein each RAID group is constituted by a plurality of physical storage devices,
wherein each of the logical storage devices is based upon a RAID group of the plurality of RAID groups,
wherein the second logical storage device corresponding to the second logical ID is included in said plurality of logical storage devices, and is not assigned to any of said plurality of logical units,
wherein said first RAID group is the basis of said first logical storage device,
wherein said second RAID group is the basis of said second logical storage device,
wherein if the transfer of data from said first logical storage device to said second logical storage device has been completed, said transfer unit performs logical ID switching processing,
wherein in said logical ID switching processing, said first logical ID which was assigned to said first logical storage device which was the data transfer source is assigned to said second logical storage device which was the data transfer destination, while on the other hand said second logical ID which was assigned to said second logical storage device which was the data transfer destination is assigned to said first logical storage device which was the data transfer source, and thereby, if an I/O command which designates said first path is received after the completion of transfer of said data, said I/O comes to be performed for said second logical storage device,
wherein said system change is said logical ID switching processing, and
wherein said security processing unit performs said security processing upon said first logical storage device, if said logical ID switching processing is detected.

8. A storage system according to claim 1, further comprising:
a path management unit which manages the plurality of paths,
wherein said path management unit, upon receipt of a command from the user for new assignment, which is assignment of a new path to said first logical storage device, does not execute said new assignment, if said security processing is being executed upon said first logical storage device.

9. A storage system according to claim 1, further comprising:
- a path management unit which manages the plurality of paths including said first path,
- wherein said security processing unit, when said system change for said first logical storage device has been detected, does not perform said security processing during this data storage time period for said first logical storage device, if information is set for said first logical storage device which specifies a data storage time period from when said system change is detected, and
- wherein said path management unit, upon receipt of a command from the user for new assignment, which is assignment of a new path to said first logical storage device, does not execute said new assignment during this data storage time period for said first logical storage device.

10. A storage system according to claim 1, wherein said security processing unit: performs said security processing sequentially from the storage region which corresponds to the head address of the logical storage device which is the subject of said security processing, to the storage region which corresponds to its final end address; calculates the state of process of said security processing upon said first logical device on the basis of the address space of said first logical device and up to what storage region corresponding to which address of said address space said security processing has been performed; and transmits information for displaying the state of progress which has been calculated to a computer used by said user.

11. A storage control method implemented by a storage system, which when a first I/O command designating a first port ID and a first logical unit has been received from a computer, performs input/output (I/O) for a first logical storage device, of a plurality of logical storage devices, the first logical storage device being assigned to said first logical unit, and each of the plurality of logical storage devices storing data the computer accesses, a plurality of logical units being provided to the computer, the method comprising:
- assigning one or more of the plurality of logical units to each of the plurality of logical storage devices,
- wherein when more than one of the plurality of logical units are assigned to said first logical storage device, there are a plurality of paths formed between each of said first logical storage device and the plurality of logical units assigned to said first logical storage device;
- storing a path table in a memory of the storage system, the path table comprising a number indicating an amount of the plurality of paths formed between said first logical storage device and each of the plurality of logical units assigned to said first logical storage device;
- receiving a delete command to delete a path of the plurality of paths, and in response to the delete command, deleting the path and decrementing the number of the plurality of paths in the path table by 1;
- detecting a system change according to which I/O for said first logical storage device cannot be performed;
- taking advantage of an opportunity presented by detection of said system change to perform security processing, which is formatting or shredding, upon said first logical storage device;
- taking the opportunity to perform the formatting or shredding when the number of the plurality of paths becomes 0, which indicates that each of the plurality of paths formed between said first logical storage device and the plurality of logical units assigned to said first logical storage device is deleted; and
- deleting the data stored in the first logical storage device by formatting or shredding.

\* \* \* \* \*